United States Patent [19]

Young

[11] 4,117,915

[45] Oct. 3, 1978

[54] RECIPROCATING LEVER FRICTION DRIVE MECHANISM FOR A BICYCLE OR OTHER OCCUPANT PROPELLED VEHICLE

[76] Inventor: Timothy Tung Jen Young, 788 Walnut St., Apt. 2, San Carlos, Calif. 94070

[21] Appl. No.: 739,351

[22] Filed: Nov. 5, 1976

Related U.S. Application Data

[63] Continuation-in-part of Ser. No. 628,074, Nov. 3, 1975, Pat. No. 4,063,747.

[51] Int. Cl.² .................... B62M 1/04; F16D 13/08; F16D 13/14; F16H 7/06
[52] U.S. Cl. ......................... 280/255; 74/219; 192/76
[58] Field of Search ........... 74/217 CV, 217 B, 216.5, 74/219; 280/255, 258; 192/105 CD, 76, 41 R

[56] References Cited

U.S. PATENT DOCUMENTS

| 298,708 | 5/1884 | Ross | 192/76 |
|---|---|---|---|
| 398,628 | 2/1889 | Laforge et al. | 192/76 |
| 403,098 | 5/1889 | Gerhard | 192/76 |
| 442,260 | 12/1890 | Schroeder | 192/76 |
| 533,635 | 2/1895 | Cox | 192/41 R |
| 565,016 | 8/1896 | Mott | 192/76 |
| 834,394 | 10/1906 | Metcalf | 192/76 |
| 1,099,651 | 6/1914 | Hurlbut | 192/76 |
| 1,801,471 | 4/1931 | Wersall | 192/105 CD |
| 4,063,747 | 12/1977 | Young | 280/255 |

*Primary Examiner*—Samuel Scott
*Assistant Examiner*—William R. Henderson

[57] ABSTRACT

A noiseless ratchet drive mechanism comprises one first element with a band shell for cylindrical friction drive engagement fixed on each side. Adjacent to this first element on each side disposed a second element coaxial with the first on a shaft. This second element consists of a disc member with a plurality of integral links, and each link is connected with a second link with its one end passing through a hole in a band ring which forms the rim of the second element. To the second link is fixed an arced brake which engages the inside of the shell for friction engagement with the first element. The turning of the second element in one direction engages the first element in friction drive while the turning of the second element in the opposite direction disengages the friction engagement.

10 Claims, 5 Drawing Figures

RECIPROCATING LEVER FRICTION DRIVE MECHANISM FOR A BICYCLE OR OTHER OCCUPANT PROPELLED VEHICLE

This is a continuation-in-part of my application Ser. No. 628,074 filed Nov. 3, 1975, now U.S. Pat. No. 4,063,747. The present application encompasses a different embodiment of the drive mechanism with novelty features.

It is the object of the present improvement to make a noiseless ratchet drive mechanism by pedalling oscillationwise to generate power a impart rotary motion through a transmission for one direction drive. This invention is particularly but not exclusively intended for a man-powered vehicle such as a pedal-operated bicycle or the like. Other objects and advantages will appear as the specification unfolds. The novel features of the present invention will be particularly set forth in the appended claims.

DRAWINGS

Figure 3A:
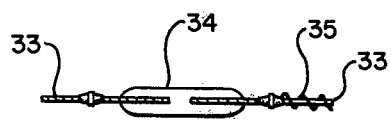
Figure 3B:
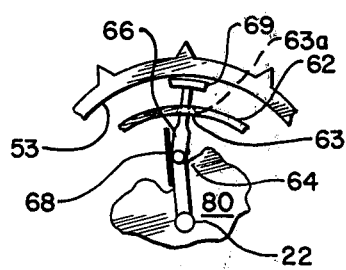
Figure 3:
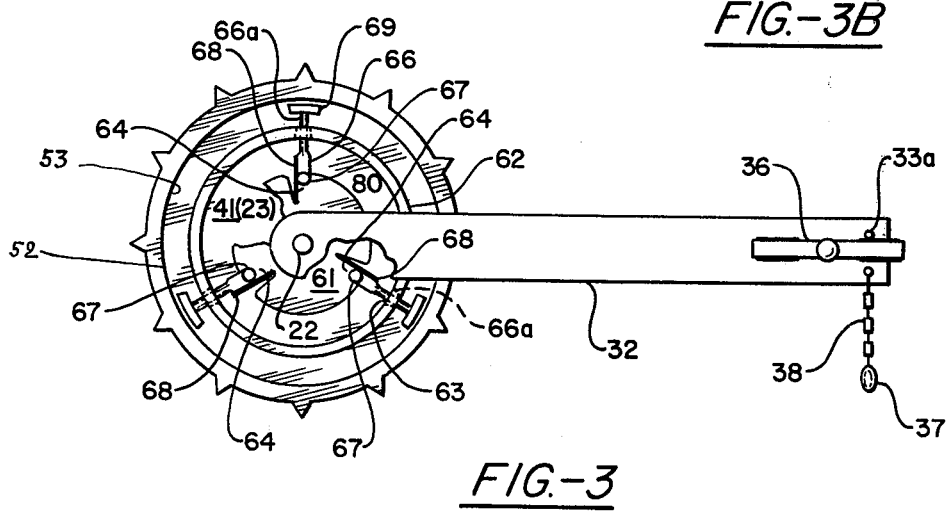

FIGS. 3, 3-A and 3-B are the noiseless ratchet drive mechanism with lever arm and accessories.

Referring now to the drawing in detail, I have disclosed a conventional bicycle having a supporting frame A with an upper tube 10, a lower front tube 11 that is inclined relative to the horizontal, and a rear upwardly extending tube 12. The supporting frame has a front fork 14 journaled therein and this fork is provided with a front wheel 15 which may be steered by handle bar 16. Upper and lower rear forks 17 and 18, respectively, of the supporting frame A has an axle 19 mounted thereon for a rear wheel 20.

Figure 1:
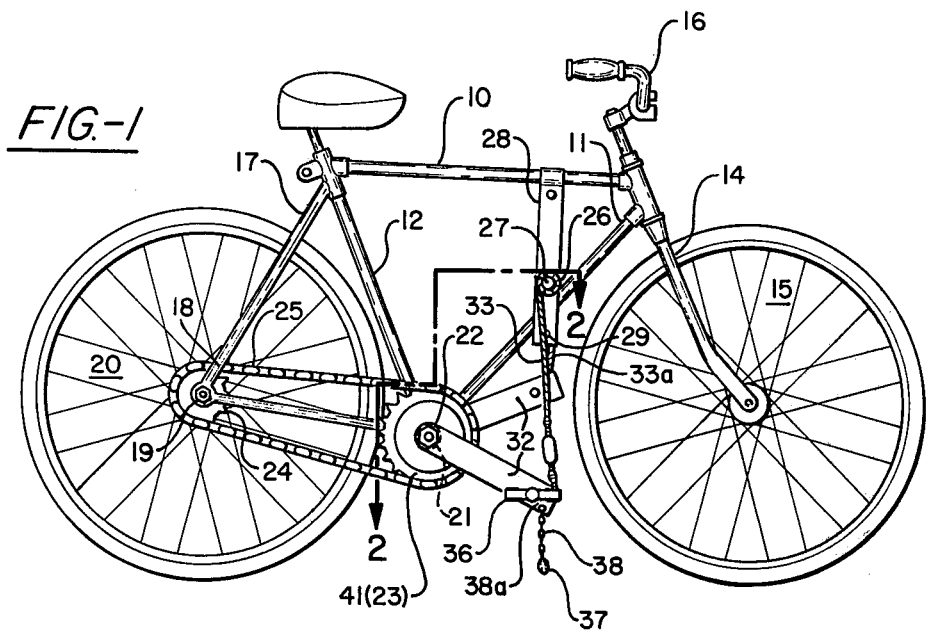
FIG. 1 is a side elevation view looking at the right side of a bicycle equipped with my improved noiseless ratchet drive mechanism.

As shown in FIG. 1 tubes 11 and 12 and the fork 18 provided a support for a transverse bearing tube 21. It will be apparent from FIG. 1 that a drive shaft 22 is journaled in this bearing tube and has a drive sprocket 23 fixed thereto. The ground engagement rear wheel 20 is provided with a driven sprocket 24 on its axle 19, and an endless chain 25 is trained over the drive and driven sprockets 23 and 24, respectively so that rotation of the drive sprocket will actuate the drive sprocket to propel the bicycle or the like.

Figure 2:
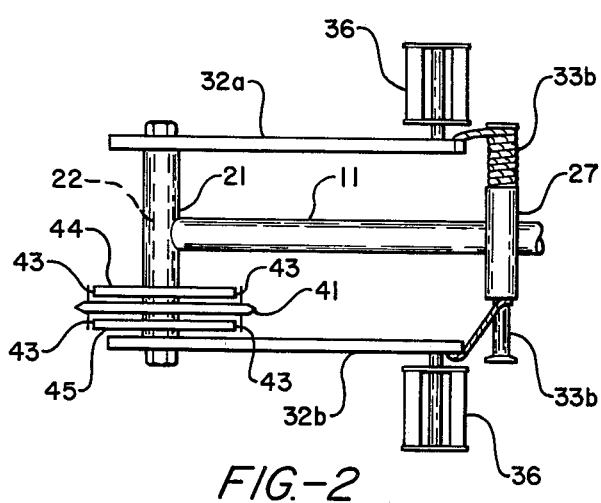
FIG. 2 is an enlarged section view taken along the vertical plane 2—2 of FIG. 1.

From FIG. 1 and FIG. 2 it will be seen that for mounting the bearing tube 26 and the attachment shaft 27 journaled in it, a bracket 28 is secured to the upper tube 10 and the lower front tube 11 by clamping bolts 29.

On the left looking forward a lever arm 32a is keyed to the shaft 22 with pedal 36 fixed perpendicular to it, and on the right a lever arm 32b with pedal 36 pivoted perpendicular to it is pivoted about the shaft; for oscillation of the lever arms a pair of cables 33 attached one end of each to the tip of each lever arm at 33a and the other end of each cable wound around and anchored at each end of the attachment shaft 27 at 33b, one clockwise and the other counterclockwise. For regulating the distance of travel of each cable a turn-buckle 34 with left-and-right screw threads is fitted to each cable. For a stop to the travel of the cable 33 on attachment shaft 27 a compression spring 35 is fitted to the upper part of the turn-buckle 34. A weight 37 is suspended by a link chain 38 from the tip of each lever arm for gravity leverage by vertical pull.

The parts thus far described are identical to those in my U.S. Pat. No. 4,063,747, and now I shall set forth the detailed specification of my improved embodiment of the noiseless ratchet drive mechanism that fit in with the parts described thus far, as follows:

The mechanism consists of one first element 41 for a driven-driver, consisting of the sprocket wheel 23, pivoting about the drive shaft 22, and on each side of the said sprocket wheel, and radially inward of the sprocket teeth, is fitted a band shell 52 with cylindrical driving engagement means 53 disposed thereon. The cylindrical engagement means has a smaller radius and angular displacement than the outer periphery of the sprocket wheel. Fixed to the drive shaft 22, on the left of the bicycle looking forward, and adjacent to the first element, is fixed a second element 44; also, on the right, looking forward, and adjacent to the first element, is fixed an identical second element 45. Both second elements pivot about the drive shaft 22.

Each second element has an axially inward facing ring band 62 approximately midway between the drive shaft and the outer periphery of the second element. The ring bands contain holes 63 which are radially symmetrical with respect to the drive shaft and allow for the passage of a plurality of radially symmetrically placed link members, consisting of first link members 64 pivoted on disc 80, and second link members 66 connected at pivot hinges 67 to first link member 64. Guardplates 68 are mounted radially symmetrically on disc 80, shown cut away, so as to act against second link member 66 as a buffer against reflex angles in the connection of link member 64 to link member 66 at the pivoted hinge 67.

The second link members 66 have rounded ends 66a of a smaller diameter than the holes 63. The holes have beveled sides 63a allowing adequate leeway for movement of the round end 66a when the device is operated. Attached to the round end 66a is a brake 69 with an arc engagement surface of substantially the same radius as the arc surface of the cylindrical drive engagement means.

To describe the operation of my invention, in FIG. 3B the link member and brake components 64, 66, and 69 are shown as flexed with a decreased effective distance between the axis of the cylindrical driving engagement means 53 and the brake 69 due to the centrifugal force of the second element moving counterclockwise in disengagement. Similarly the effective distance is increased, as shown in FIG. 3, due to the centrifugal force of the second element moving clockwise to extend the brake 69 in driving engagement with the cylindrical driving engagement means 53 of the first element.

I claim:

1. In an occupant propelled vehicle including a frame, a ground engaging wheel mounted on said frame, a driven sprocket for rotating said wheel, a drive sprocket, a drive shaft freely journaled concentric to said drive sprocket, a first lever arm fixed to one end of said shaft, a second lever arm rotatable on the other end of said shaft; an attachment shaft journaled on said frame, a first cable having one end attached to the tip of one of said lever arms and the other end wound clockwise on said attachment shaft, and a second cable having one end attached to the tip of the other of said lever arm, and the other end wound counterclockwise on said attachment shaft, and a turn-buckle with right-and-left threaded screws fitted to each of said cable whereby the cable length may be adjusted, and a compression spring mounted on said turn-buckle for moving into stopping engagement with said attachment shaft to limit the travel of said cables, and a leverage adding weight suspended from the tip of each of said lever arms by a link chain;

the improvement comprising a ratchet mechanism for driving said driving sprocket, said mechanism consists of: a first element having cylindrical engagement means, radially inward of the sprocket teeth and attached to the sprocket wheel so as to extend axially from both sides of the sprocket wheel; a pair of second elements coaxial with a adjacent either side of the first link members integrally connected to the said second elements; second link members with brakes surfaces on the radially outward ends extending from the first link members and adapted to frictionally engaged the brake surfaces with the cylindrical engagement means; the connection between the first and second link members adapted to flex or extend the brake surface into disengagement or engagement with the cylindrical driving engagement means of the first element;

the brake surface having a radius of arc substantially the same as the radius of the cylindrical drive engagement means;

a band attached to the second elements with radially symmetrical holes for the link members to flex and extend through;

a guardplate mounted as a buffer against reflex angles in the member connection in extension;

and where the flexion of the member connection results in the disengagement of the brake with the cylindrical engagement means, extension of the connection results in the friction drive engagement.

2. In an occupant propelled vehicle the ratchet drive mechanism as claimed in claim 1, wherein a centrifugal force is directed through the members connection causing tight frictional driving engagement by extending the members.

3. In an occupant propelled vehicle the ratchet drive mechanism as claimed in claim 1, wherein a centrifugal force is applied to the members connection causing disengagement of the friction engagement by flexing the members.

4. In an occupant propelled vehicle the ratchet drive mechanism as claimed in claim 1, wherein the plurality of the brake surfaces engage the cylindrical engagement means along lines parallel to the axis of the cylindrical engagement means.

5. In an occupant propelled vehicle the ratchet drive mechanism as claimed in claim 1, wherein the effective distance between the brake surfaces and the axis of the cylindrical driving engagement means tends to increase with increasing compressive driving engagement.

6. In an occupant propelled vehicle the ratchet drive mechanism as claimed in claim 1, wherein the effective distance between the brake surfaces and the engagement means decreases with disengagement.

7. In an occupant propelled vehicle the ratchet drive mechanism as claimed in claim 1, wherein the engagement surfaces of the brakes and the surface of the cylindrical engagement means are arced in substantially identical radius.

8. In an occupant propelled vehicle the ratchet drive mechanism as claimed in claim 1, wherein the members connection is guarded against reflex as effective distance increases between members connection and the cylindrical engagement means in increasing compressive driving engagement.

9. In an occupant propelled vehicle the ratchet drive mechanism as claimed in claim 1, wherein the round part of the members connection in the round and sunken hole eliminates binding of the link members during engaging and disengaging with the cylindrical engagement means.

10. In an occupant propelled vehicle the ratchet drive mechanism as claimed in claim 1, wherein in driving, the second element engages the inside of the band shell at the cylindrical driving engagement means of the first element, prescribing a smaller angular displacement distance than the angular displacement distance prescribed by the first element in relative motion.

* * * * *